United States Patent
Chen et al.

(10) Patent No.: US 8,451,689 B2
(45) Date of Patent: May 28, 2013

(54) ULTRASONIC APPARATUS WITH AN ADJUSTABLE HORN

(75) Inventors: Tzu-Nan Chen, Taipei (TW); Yi-Min Lin, Taipei (TW)

(73) Assignee: Lite-On It Corporation, Taipei (TW)

( * ) Notice: Subject to any disclaimer, the term of this patent is extended or adjusted under 35 U.S.C. 154(b) by 386 days.

(21) Appl. No.: 12/742,136

(22) PCT Filed: Nov. 12, 2007

(86) PCT No.: PCT/CN2007/003199
§ 371 (c)(1),
(2), (4) Date: May 10, 2010

(87) PCT Pub. No.: WO2009/062333
PCT Pub. Date: May 22, 2009

(65) Prior Publication Data
US 2011/0018447 A1  Jan. 27, 2011

(51) Int. Cl.
*G01S 15/00* (2006.01)
(52) U.S. Cl.
USPC .............................. 367/95; 367/96; 367/138
(58) Field of Classification Search
USPC ..................... 367/95, 96; 315/150
See application file for complete search history.

(56) References Cited

U.S. PATENT DOCUMENTS

| 3,516,384 | A | * | 6/1970 | Will | 116/137 R |
| 3,909,556 | A | * | 9/1975 | Johanson | 381/313 |
| 4,046,464 | A | * | 9/1977 | Shimazaki et al. | 352/141 |
| 4,183,007 | A | | 1/1980 | Baird | |
| 4,305,021 | A | * | 12/1981 | Schreiden | 315/159 |
| 4,551,654 | A | * | 11/1985 | Barnum | 318/159 |
| 5,110,403 | A | | 5/1992 | Ehlert | |
| 6,324,052 | B1 | * | 11/2001 | Azima et al. | 361/679.23 |
| 6,497,634 | B1 | * | 12/2002 | Bode et al. | 475/211 |
| 6,658,110 | B1 | * | 12/2003 | Andersen | 379/433.02 |
| RE38,887 | E | * | 11/2005 | Bode et al. | 475/211 |
| 7,027,355 | B2 | * | 4/2006 | Baldwin et al. | 367/93 |
| 7,095,361 | B2 | * | 8/2006 | Mattes et al. | 342/70 |
| 7,378,947 | B2 | * | 5/2008 | Daura Luna et al. | 340/435 |
| 2002/0059022 | A1 | * | 5/2002 | Breed et al. | 701/45 |
| 2003/0160717 | A1 | * | 8/2003 | Mattes et al. | 342/70 |

(Continued)

FOREIGN PATENT DOCUMENTS

| CN | 2070520 U | 1/1991 |
| CN | 2502282 Y | 7/2002 |

(Continued)

OTHER PUBLICATIONS

International Search Report and Written Opinion dated Aug. 7, 2008.

*Primary Examiner* — Isam Alsomiri
*Assistant Examiner* — James Hulka
(74) *Attorney, Agent, or Firm* — McClure, Qualey & Rodack, LLP (57) ABSTRACT

The present invention discloses an ultrasonic apparatus with an adjustable horn. The ultrasonic apparatus comprises a transmission device, a horn and an ultrasonic transceiver device. The horn and the transmission device are geared by a helical gear. The ultrasonic transceiver device is connected to the end of the helical gear. When the transmission device moves the horn to a first position, the ultrasonic transceiver device is applied for on/off control; while the transmission device moves the horn to a second position, the ultrasonic sensor is applied for digital control.

13 Claims, 5 Drawing Sheets

U.S. PATENT DOCUMENTS

| | | | |
|---|---|---|---|
| 2004/0092808 A1* | 5/2004 | Ogawa | 600/407 |
| 2004/0097781 A1* | 5/2004 | Ichikawa et al. | 600/9 |
| 2004/0130969 A1* | 7/2004 | Baldwin et al. | 367/93 |
| 2004/0183661 A1* | 9/2004 | Bowman | 340/435 |
| 2006/0044800 A1* | 3/2006 | Reime | 362/276 |
| 2006/0152351 A1* | 7/2006 | Daura Luna et al. | 340/435 |
| 2006/0269042 A1* | 11/2006 | Muhanna et al. | 378/57 |

FOREIGN PATENT DOCUMENTS

| | | | |
|---|---|---|---|
| CN | 2725909 Y | | 9/2005 |
| CN | 2800293 Y | | 7/2006 |
| GB | 2406634 A | * | 4/2005 |
| JP | 55101876 A | | 8/1980 |

* cited by examiner

ULTRASONIC APPARATUS WITH AN ADJUSTABLE HORN

CROSS REFERENCE TO RELATED APPLICATION

This application is the 35 U.S.C. §371 national stage of PCT application PCT/CN2007/003199, filed Nov. 12, 2007, the disclosure of which is hereby incorporated by reference.

FIELD OF THE INVENTION

The present invention relates to an ultrasonic apparatus, and more particularly to the ultrasonic apparatus with an adjustable horn.

BACKGROUND OF THE INVENTION

Nowadays sensor lights or switches use infrared detectors, microwave devices or ultrasonic transceivers which detect motion of objects to accomplish the control of sensor lights or switches. The infrared detectors or microwave devices with the merits of easy-design and low-cost may only provide a function of on/off control. However, the ultrasonic transceivers may not only provide the function of on/off control but also provide a function of displacement measurement. The relative distance between the object and the ultrasonic transceiver are calculated based on the speed of the ultrasound travelling in the corresponding medium and the time-of-flight (TOF) of the ultrasound. Thus, the ultrasonic transceivers are widely applied in motion/displacement detection of the objects.

U.S. Pat. No. 4,305,021 discloses a switch for controlling the operation of a light source in response to the presence of a moving person or object which is detected by a microwave device and in response to the magnitude of ambient light provided other than by the light source. U.S. Pat. No. 4,551,654 discloses a lighting control circuit responsive to amplitude variations related to the effects of movement on the reflection of electromagnetic energy at an ultrasonic frequency. U.S. Pat. No. 7,027,355 discloses an ultrasonic device which is provided for detecting motion or displacement of an object in a monitored zone.

In conclusion, the ultrasonic transceivers are applied for on/off control or displacement calculation of the detected object. The detailed structure and basic principle of the ultrasonic transceivers are described in detail below.

Figure 1:
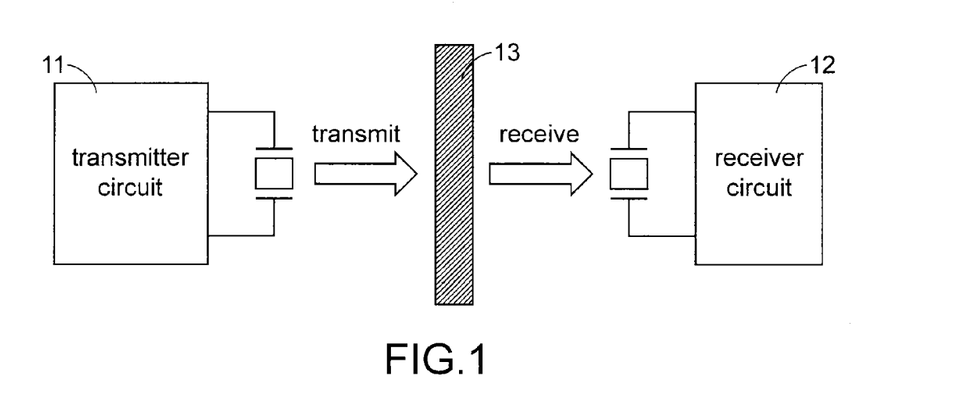
FIG. 1 is a diagram illustrating the circuit structure of an ultrasonic device applied as a switch.

Refer to FIG. 1, which illustrates the circuit structure of an ultrasonic device applied as a switch. Wherein a transmitter circuit 11 and a receiver circuit 12 are positioned in opposition. The receiver circuit 12 receives an ultrasonic signal transmitted by the transmitter circuit 11 when there's no obstacle 13 while the receiver circuit 12 doesn't receive the ultrasonic signal transmitted by the transmitter circuit 11 when there's an obstacle 13. That is to say, the detected voltage level by the receiver circuit 12 is varied when there's an obstacle 13 in the detected range of the receiver circuit 12. Thus, nowadays outdoor motion sensor security lights usually adopt the similar circuit structure of the ultrasonic device mentioned above.

Figure 2:
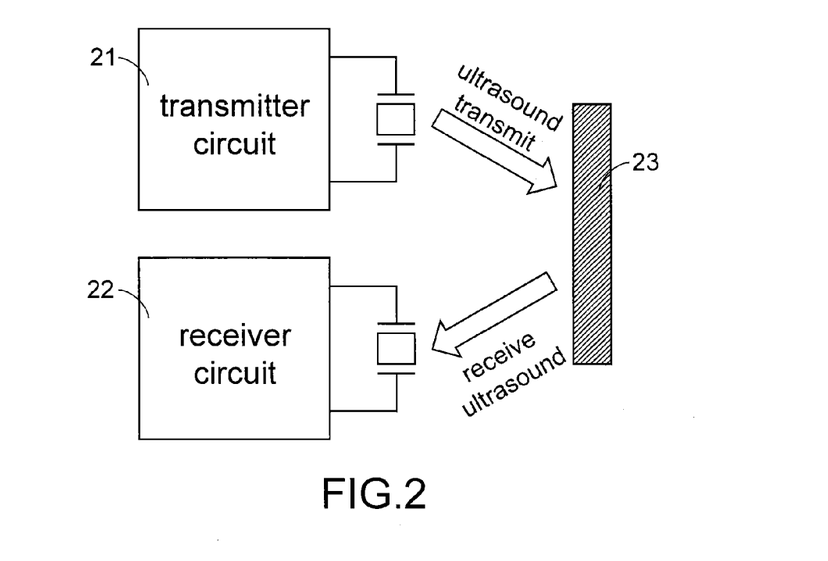
FIG. 2 is a diagram illustrating the circuit structure of an ultrasonic device applied for displacement calculation.

Refer to FIG. 2, which illustrates the circuit structure of an ultrasonic device applied for displacement calculation. Wherein a transmitter circuit 21 and a receiver circuit 22 are positioned on the same side. The ultrasonic signal transmitted by the transmitter circuit 21 is reflected to the receiver circuit 22 by an obstacle 23. The displacement is then calculated based on the speed of the ultrasonic signal travelling in the corresponding medium and the time-of-flight (TOF) of the ultrasonic signal. The medium is not limited to air. The medium may also be liquid or solid. Representative application of ultrasonic displacement calculation is water depth detection or water level detection and so on.

The prior art of the present invention converts the time-of-flight which represents the relative distance between the obstacle and the ultrasonic transceiver to a digital control signal for controlling the intensity or color of a lighting system, therefore a low-cost and reliable remote control device for the lighting system is provided.

Besides, an ultrasonic device when designing its control application should be considered with directionality. The directionality of the ultrasonic device depends on its beam angle. The directionality of the ultrasonic device is better when the beam angle of the ultrasonic device is narrower. That is to say, the reflected signal detected by the ultrasonic device with narrower beam angle becomes stronger, but at the same time the detected range of the ultrasonic device becomes smaller. If the ultrasonic device is applied for displacement calculation, the ultrasonic device should be designed with better directionality. The afterward signal processing and displacement calculation benefit from stronger reflected signal detected by the ultrasonic device. On the contrary, the directionality of the ultrasonic device is worse when the beam angle of the ultrasonic device is wider. That is to say, the reflected signal detected by the ultrasonic device with wider beam angle becomes weaker, but at the same time the detected range of the ultrasonic device becomes wider. If the ultrasonic device is applied for on/off control, the ultrasonic device can be designed with worse directionality. Therefore, the ultrasonic device with wider detected range is more suitable for on/off control.

In prior art, a horn is added to narrow the beam angle of the ultrasonic device so that the directionality of the ultrasonic device is improved. U.S. Pat. No. 3,516,384 discloses an ultrasonic device in combination with a vehicle in which ultrasonic sound is beamed in advance of the moving vehicle on a thoroughfare so that said sound may be heard by an animal ahead of the moving vehicle to induce the animal to leave the road before it is struck by the vehicle. A horn in positioned ahead of the ultrasonic device to improve the directionality of the ultrasonic device in the claimed invention. In addition, U.S. Pat. No. 5,110,403 discloses a horn having improved efficiency.

In view of the above prior art, the ultrasonic devices have both the merits of motion detection and displacement calculation. If a lighting system adopting ultrasonic devices is turned on/off based on motion detection, and the intensity and the color of the lighting system is then controlled after the lighting system is turned on, at least two ultrasonic devices are needed to accomplish the above functions. Wherein one of ultrasonic devices are applied for motion detection (i.e. controlling on/off of the lighting system) while the other ultrasonic device are applied for displacement calculation (i.e. controlling the intensity and color of the lighting system). However, this kind of configuration for the lighting system requires higher cost and the space for designing the lighting system is also limited. Therefore, a solution of improving the configuration and designing space for the lighting system adopting ultrasonic devices is the subject matter of the present invention.

SUMMARY OF THE INVENTION

It is an object of the present invention is to provide an ultrasonic apparatus with an adjustable horn, the configuration and designing space for the lighting system adopting ultrasonic devices are thus improved.

The present invention discloses an ultrasonic apparatus with an adjustable horn. The ultrasonic apparatus comprises a transmission device, a horn and an ultrasonic transceiver device. The horn and the transmission device are geared by a helical gear. The ultrasonic transceiver device is connected to the end of the helical gear. When the horn driven by the transmission device is moved to a first position, the ultrasonic transceiver device is applied for on/off control; while the horn driven by the transmission device is moved to a second position, the ultrasonic sensor is applied for digital control.

According to the claimed invention, the beam angle of the ultrasonic transceiver device is a first angle and the ultrasonic transceiver device is applied for on/off control when the transmission device moves the horn to the first position.

According to the claimed invention, the beam angle of the ultrasonic transceiver device is the second angle and the ultrasonic transceiver device is applied for digital control when the transmission device moves the horn to the second position.

According to the claimed invention, the first angle is wider than the second angle.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

If a lighting system adopting ultrasonic devices is turned on/off based on motion detection, and the intensity and the color of the lighting system is then controlled based on displacement detection, at least two ultrasonic devices are needed to accomplish the above functions. However, this kind of configuration for the lighting system requires higher cost and the space for designing the lighting system is also limited. Therefore, a solution of improving the above problems, an ultrasonic apparatus used in a lighting system is disclosed.

Figure 3A:
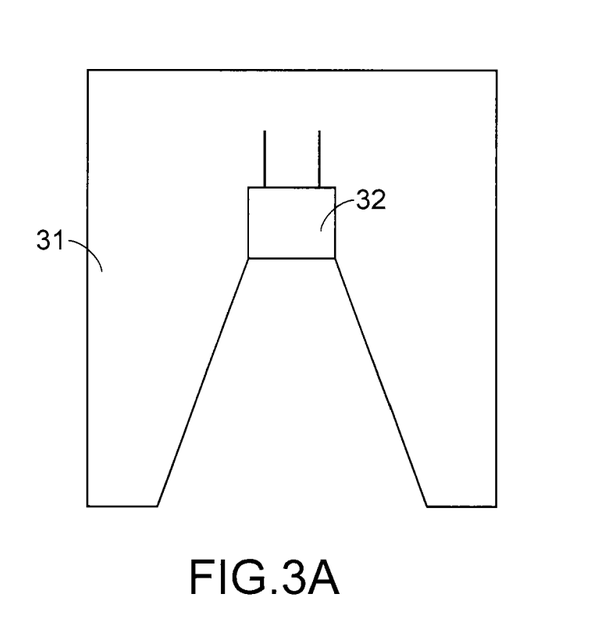
FIG. 3A and FIG. 3B are diagrams illustrating an ultrasonic apparatus with an adjustable horn under different beam angles according to the present invention.
Figure 3B:
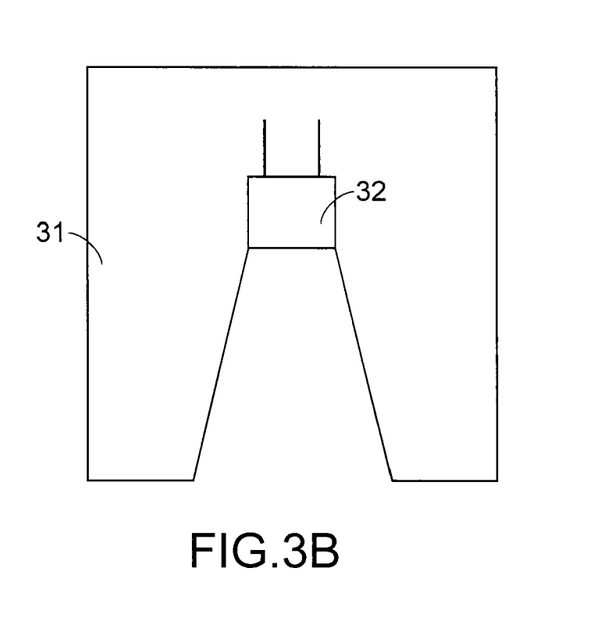

Refer to FIG. 3A and FIG. 3B, which illustrate an ultrasonic apparatus with an adjustable horn under different beam angles according to the present invention. When the adjustable horn 31 is adjusted so that the beam angle of the ultrasonic apparatus 32 has a first angle as shown in FIG. 3A, the directionality of the ultrasonic apparatus 32 is less good, but at the same time the detected range of the ultrasonic apparatus 32 is wider. The ultrasonic apparatus 32 is then suitable for motion detection or applied for enabling signal of a lighting system. Thus when the beam angle of the ultrasonic apparatus 32 is as shown in FIG. 3A, the ultrasonic apparatus 32 enters detection mode. The ultrasonic apparatus 32 under detection mode acts like an infrared switch and is in charge of the on/off control of the lighting system.

However, when the lighting system is turned on and the adjustable horn 31 is adjusted so that the beam angle of the ultrasonic apparatus 32 has a second angle as shown in FIG. 3B, the directionality of the ultrasonic apparatus 32 becomes better. Although the detected range of the ultrasonic apparatus 32 becomes smaller, the reflected signal detected by the ultrasonic apparatus 32 becomes stronger. The ultrasonic apparatus 32 is then suitable for controlling the intensity and color of the lighting system. That is to say, the ultrasonic apparatus 32 converts the time-of-flight which represents the relative distance between the obstacle and the ultrasonic transceiver to a digital control signal for controlling the intensity and color of a lighting system. Thus when the beam angle of the ultrasonic apparatus 32 is as shown in FIG. 3B, the ultrasonic apparatus 32 enters control mode. The lighting system awaits control orders when the ultrasonic apparatus 32 is under control mode. When the lighting system is turned off, the adjustable horn is adjusted so that the beam angle of the ultrasonic apparatus 32 is shown in FIG. 3A. That is to say, the ultrasonic apparatus 32 enters detection mode again and awaits the next turning-on of the lighting system.

An ultrasonic apparatus with an adjustable horn wherein a single ultrasonic device is utilized attains both the function of turn-on/off and digital control according to the present invention. Hereinafter, there will be described embodiments of the present invention.

Figure 4A:
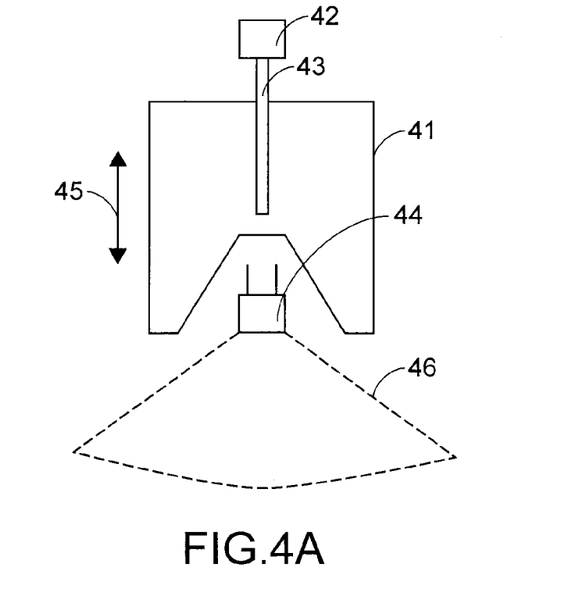
FIG. 4A and FIG. 4B are diagrams illustrating an ultrasonic apparatus according to a first embodiment of the present invention.
Figure 4B:
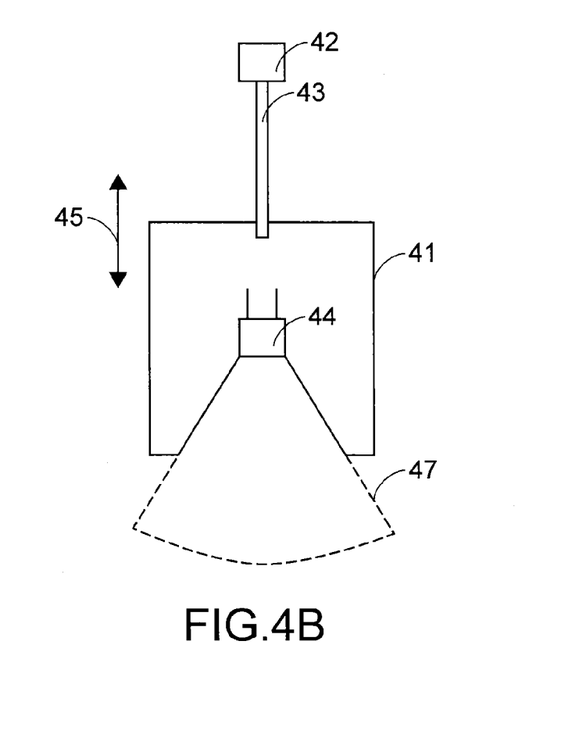

Refer to FIG. 4A and FIG. 4B, which illustrate an ultrasonic apparatus according to a first embodiment of the present invention. Wherein a horn 41 and a transmission device 42 are geared by a helical gear 43, and an ultrasonic transceiver device 44 is positioned at the end of the helical gear 43. The horn 41 moves up and down as shown in the direction 45 of FIG. 4A according to rotating direction of the helical gear 43 driven by the transmission device 42.

When the horn 41 is moved to position 1 as shown in FIG. 4A, the beam angle of the ultrasonic transceiver device 44 is less affected by the horn 41, the directionality of the ultrasonic transceiver device 44 is then less good. However, the detected range 46 of the ultrasonic transceiver device 44 is larger and the ultrasonic transceiver device is suitable for on/off control. When the horn 41 is moved to position 2 as shown in FIG. 4B, the beam angle of the ultrasonic transceiver device 44 is affected by the horn 41, the directionality of the ultrasonic transceiver device 44 becomes better. Although the detected range 47 of the ultrasonic transceiver device 44 becomes smaller, the detected reflected signal becomes stronger. The ultrasonic transceiver device is thus suitable for digital controlling of a lighting system, controlling the intensity and color of the lighting system for example.

Therefore, the horn 41 is moved so that the relative position of the horn 41 and the ultrasonic transceiver device 44 is varied because the transmission device 42 and the horn 41 are geared. The beam angle of the ultrasonic transceiver device 44, i.e. the directionality of the ultrasonic transceiver device 44, is also varied when the relative positions of the horn 41 and the ultrasonic transceiver device 44 is varied. An on/off control and a digital control are switched. The ultrasonic transceiver device 44 thus can switch between two modes (on/off control mode and digital control mode).

Figure 5A:
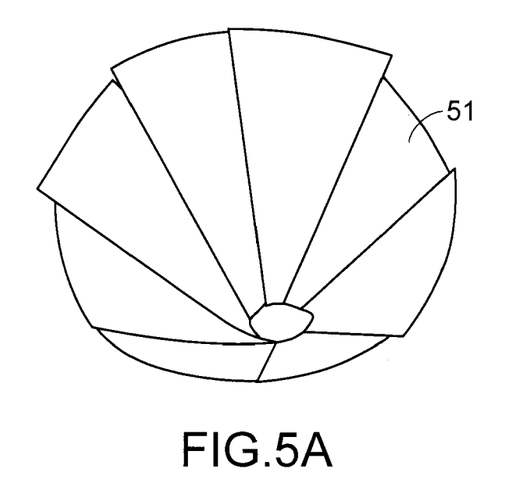
FIG. 5A and FIG. 5B are diagrams illustrating an ultrasonic apparatus according to another embodiment of the present invention.
Figure 5B:
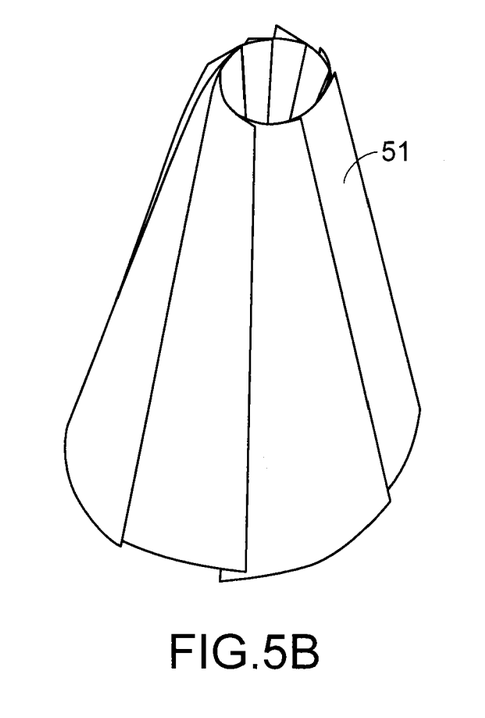

Refer to FIG. 5, which illustrates an ultrasonic apparatus according to another embodiment of the present invention. The horn which differs from the horn of the first embodiment is composed of a number of blades 51. The opening angle of these blades 51 are controlled by the transmission device, a motor for example, which is not illustrated in FIG. 5. When the opening angle of the horn driven by the transmission device has a third angle as shown in FIG. 5A, the beam angle of the ultrasonic transceiver device is a first angle, the ultrasonic transceiver device is suitable for on/off control. When the opening angle of the horn driven by the transmission device has a fourth angle as shown in FIG. 5B, the beam angle of the ultrasonic transceiver device is a second angle, and the directionality of the ultrasonic transceiver device becomes better and the detected reflected signal becomes stronger. The ultrasonic transceiver device is thus suitable for digital controlling of a lighting system, controlling the intensity and color of the lighting system for example.

Figure 6:
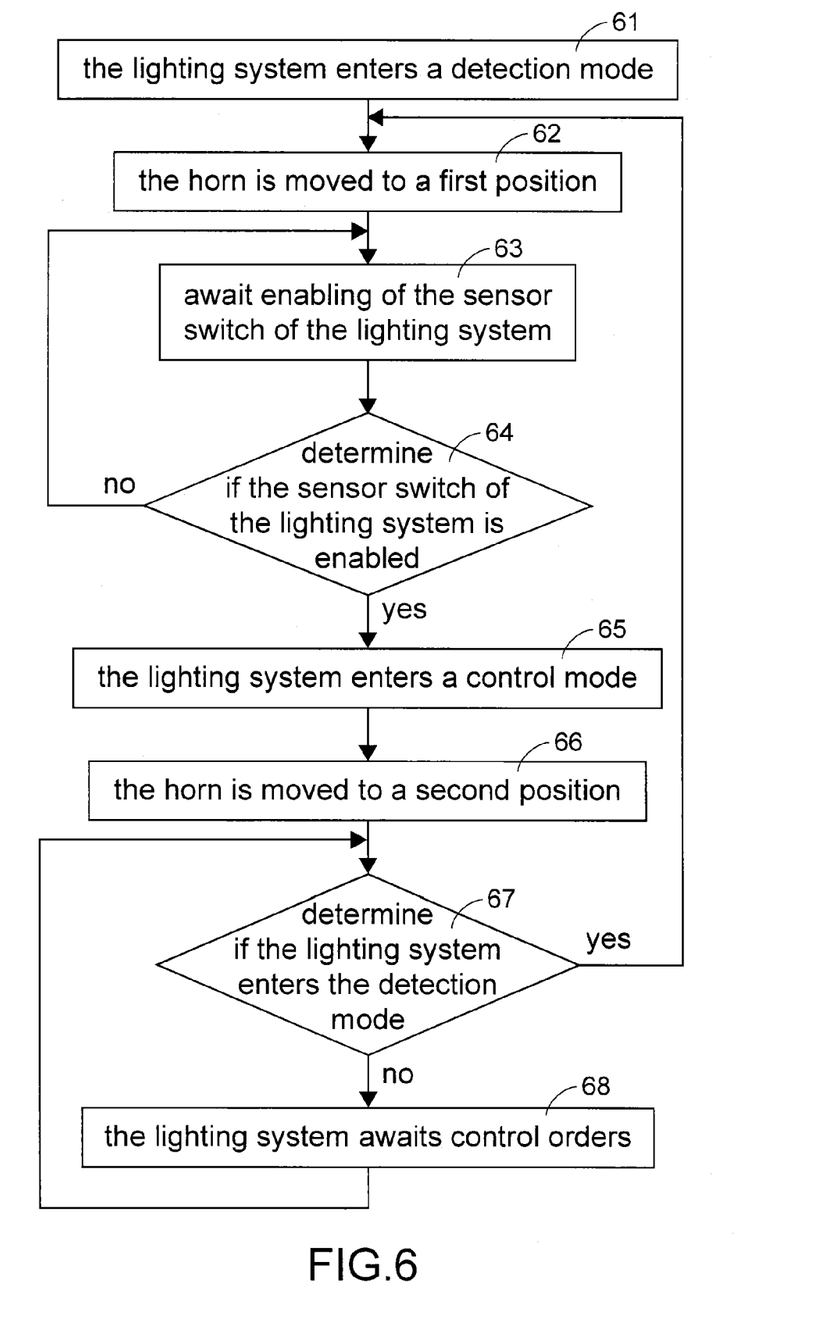
FIG. 6 is a diagram illustrating the control flow of the ultrasonic apparatus according to the first embodiment of the present invention applied in a lighting system.

Refer to FIG. 6, which illustrates the control flow diagram of the ultrasonic apparatus according to the first embodiment of the present invention applied in a lighting system.

Step 61: the lighting system enters a detection mode.

Step 62: the horn is moved to a first position.

Step 63: the lighting system awaits enabling of the sensor switch.

Step 64: determine if the sensor switch of the lighting system is enabled. If the sensor switch of the lighting system is enabled, proceeds step 65, else proceeds step 63.

Step 65: the lighting system enters a control mode.

Step 66: the horn is moved to a second position.

Step 67: determine if the lighting system entering a detection mode. If the lighting systems enters a detection mode, it proceeds to step 62, else it proceeds to step 68.

Step 68: the lighting system awaits control orders.

Firstly, step 61 and step 62 are performed: the lighting system enters a detection mode, the horn is moved to a first position.

The lighting system is set in a detection mode initially. The horn is thus moved to the first position. The directionality of the ultrasonic transceiver device becomes less good, but the detected range of the ultrasonic transceiver device becomes larger. The ultrasonic transceiver device is applied for on/off control and applied as a sensor switch of the lighting system.

Then, step 63 and step 64 are performed: Awaiting the enabling of the sensor switch of the lighting system. If the sensor switch of the lighting system is enabled, step 65 is performed, else step 63 is performed.

Because the ultrasonic transceiver device in step 62 and step 63 is applied as a sensor switch, it is determined if the sensor switch is enabled. If the sensor switch is not enabled, the lighting system holds in off condition. The lighting system continuously awaits enabling of the sensor switch. If the sensor switch is enabled, the lighting system is turned on and step 65 is performed.

Next, step 65 and step 66 are performed: the lighting system enters a control mode and the horn is moved to a second position.

When the lighting system enters a control mode, the horn is moved to the second position. Thus the directionality of the ultrasonic transceiver device becomes better. Although the detected range of the ultrasonic transceiver device becomes smaller, the detected reflected signal becomes stronger. At that time the ultrasonic transceiver device controls the intensity or the color of the lighting system based on the time-of-flight of the detected object, gesture for example.

At last, step 67 and step 68 are performed: It is determined whether the lighting system enters a detection mode. If the lighting system doesn't enter the detection mode, the lighting system awaits control orders.

Because the horn is moved to the second position in step 65 and step 66, the ultrasonic transceiver device is applied for controlling the intensity or the color of the lighting system. However, it should be firstly determined if the lighting system is entering the detection mode (if the user wants to turn off the lighting system) before awaiting the control orders of the lighting system. If the lighting system is entering the detection mode, the horn is moved to the first position (step 62) and afterward steps are performed only after the sensor switch is enabled again.

If the lighting system is not entering the detection mode in step 67, the lighting system awaits control orders. When the ultrasonic transceiver device senses the variation of time-of-flight of the detected object, the displacement variation because of gesture for example, the lighting system converts the variation of the time-of-flight to a digital control signal for controlling the intensity or the color of the lighting system.

It is to be noted that even under the control mode, the user can turn off the lighting system (i.e. the lighting system goes back to the detection mode) anytime. Consequently, the ultrasonic apparatus with an adjustable horn which only a single ultrasonic device is utilized and attains both the function of turn-on/off and digital control according to the present invention.

Thus, the virtue of the present invention is combining an ultrasonic transceiver device with a horn to attain both the function of motion detection and digital control. The cost and designing space for the lighting system is thus improved. The position or the opening angle of the horn is adjusted so that the strength of the reflected signal and the detected range of the ultrasonic transceiver device are adjusted based upon different usage purposes or conditions. Therefore an ultrasonic apparatus which utilizes only a single ultrasonic device may attain both the function of motion detection and digital control.

Although the ultrasonic apparatus is applied in the lighting system according to the embodiment of the present invention, the applied filed of the ultrasonic apparatus is not limited. Any systems which require both the functions of motion detection and digital control may also adopt the ultrasonic apparatus of the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An ultrasonic apparatus with an adjustable horn comprising:
   a transmission device;
   a horn, wherein the horn and the transmission device are geared by a helical gear; and
   an ultrasonic transceiver device, wherein the ultrasonic transceiver device is connected to the end of the helical gear;
   wherein, the beam angle of the ultrasonic transceiver device has a first angle when the horn driven by the transmission device is moved to a first position; while the beam angle of the ultrasonic transceiver device has a second angle when the horn driven by the transmission device is moved to a second position.

2. The ultrasonic apparatus according to claim 1 wherein the first angle is wider than the second angle.

3. The ultrasonic apparatus according to claim 1 wherein the ultrasonic transceiver device is applied for on/off control when the beam angle of the ultrasonic transceiver device is the first angle.

4. The ultrasonic apparatus according to claim 1 wherein the ultrasonic transceiver device is applied for digital control when the beam angle of the ultrasonic transceiver device is the second angle.

5. An ultrasonic apparatus with an adjustable horn comprising:
   a transmission device;
   a horn, wherein the horn which are composed of a plurality of blades and the transmission device are geared by a helical gear; and
   an ultrasonic transceiver device, wherein the ultrasonic transceiver device is connected to the end of the helical gear;
   wherein, the beam angle of the ultrasonic transceiver device has a first angle when the opening angle of the blades driven by the transmission device has a third angle; while the beam angle of the ultrasonic transceiver device has a second angle when the opening angle of the blades driven by the transmission device has a fourth angle.

6. The ultrasonic apparatus according to claim 5 wherein the first angle is wider than the second angle.

7. The ultrasonic apparatus according to claim 5 wherein the ultrasonic transceiver device is applied for on/off control when the beam angle of the ultrasonic transceiver device is the first angle.

8. The ultrasonic apparatus according to claim 5 wherein the ultrasonic transceiver device is applied for digital control when the beam angle of the ultrasonic transceiver device is the second angle.

9. A control method for an ultrasonic apparatus with an adjustable horn applied in a lighting system, wherein the ultrasonic apparatus comprises a transmission device, a horn and an ultrasonic transceiver device, comprising:
   controlling the transmission device moving the horn to a first position so that the lighting system is in a detection mode;
   determining if the lighting system under the detection mode is enabled; and
   controlling the transmission device moving the horn to a second position so that the lighting system is in a control mode if the lighting system is enabled.

10. The control method according to claim 9, further comprising:
    awaiting enabling of the lighting system continuously if the lighting system under the detection mode is not enabled.

11. The control method according to claim 9, further comprising:
    controlling the transmission device moving the horn to the first position so that the lighting system enters the detection mode if user turns off the lighting system under the control mode.

12. The control method according to claim 9, wherein the beam angle of the ultrasonic transceiver device is a first angle and the ultrasonic transceiver device is applied for on/off control when the transmission device moves the horn to the first position.

13. The control method according to claim 9, wherein the beam angle of the ultrasonic transceiver device is a second angle and the ultrasonic transceiver device is applied for digital control when the transmission device moves the horn to the second position.

* * * * *